(12) United States Patent
Krumbe et al.

(10) Patent No.: US 8,975,361 B2
(45) Date of Patent: Mar. 10, 2015

(54) PROCESS FOR THE PRODUCTION OF WATER AND SOLVENT-FREE POLYMERS

(75) Inventors: Wolfgang Krumbe, Leichlingen (DE); Rolf Feller, Mettmann (DE); Paul Wagner, Düsseldorf (DE); Hanns-Ingolf Paul, Leverkusen (DE); Martin Siebuerger, Leverkusen (DE); Heike Kloppenburg, Düsseldorf (DE); Alicia Le-Sattler, Bochum (DE); John Lovegrove, Sarnia (CA)

(73) Assignee: LANXESS Deutschland GmbH, Cologne (DE)

( * ) Notice: Subject to any disclaimer, the term of this patent is extended or adjusted under 35 U.S.C. 154(b) by 14 days.

(21) Appl. No.: 13/635,781

(22) PCT Filed: Mar. 23, 2011

(86) PCT No.: PCT/EP2011/054455
§ 371 (c)(1),
(2), (4) Date: Apr. 26, 2013

(87) PCT Pub. No.: WO2011/117302
PCT Pub. Date: Sep. 29, 2011

(65) Prior Publication Data
US 2013/0211030 A1    Aug. 15, 2013

(30) Foreign Application Priority Data
Mar. 24, 2010   (EP) ..................................... 10157623

(51) Int. Cl.
| | | |
|---|---|---|
| *C08G 63/02* | (2006.01) | |
| *C08L 9/00* | (2006.01) | |
| *C08F 6/10* | (2006.01) | |
| *C08F 6/12* | (2006.01) | |
| *C08C 2/00* | (2006.01) | |
| *C08G 64/00* | (2006.01) | |

(52) U.S. Cl.
CPC ... *C08F 6/10* (2013.01); *C08L 9/00* (2013.01); *C08F 6/12* (2013.01); *C08C 2/00* (2013.01)
USPC ........ 528/271; 264/141; 525/332.3; 528/176; 528/190; 528/193; 528/194; 528/196; 528/198; 528/272; 528/501

(58) Field of Classification Search
USPC ........ 264/141; 525/332.3; 528/176, 190, 193, 528/194, 196, 198, 271, 272, 501
See application file for complete search history.

(56) References Cited

U.S. PATENT DOCUMENTS

| | | | |
|---|---|---|---|
| 3,117,953 A | 1/1964 | Goebel et al. | |
| 4,055,001 A | 10/1977 | Forster et al. | |
| 4,686,279 A | 8/1987 | Nagtzaam et al. | |
| 5,156,706 A * | 10/1992 | Sephton ........................ | 159/47.1 |
| 5,283,021 A | 2/1994 | Shih | |
| 5,684,087 A * | 11/1997 | Wulff et al. ..................... | 525/63 |
| 6,811,294 B1 | 11/2004 | Elsner et al. | |
| 7,226,989 B2 * | 6/2007 | Silvi et al. ..................... | 528/481 |
| 7,781,533 B2 | 8/2010 | Ozawa et al. | |
| 2001/0056176 A1 | 12/2001 | Takami et al. | |
| 2009/0162470 A1* | 6/2009 | Schnabl ........................ | 425/209 |
| 2012/0043687 A1* | 2/2012 | Kirchhoff et al. ............. | 264/141 |
| 2012/0157555 A1* | 6/2012 | Myrstad et al. ............... | 518/700 |
| 2013/0203942 A1* | 8/2013 | Paul et al. ................. | 525/332.3 |
| 2013/0203943 A1* | 8/2013 | Kirchhoff et al. .......... | 525/332.3 |
| 2013/0217833 A1* | 8/2013 | Paul et al. .................... | 525/340 |

FOREIGN PATENT DOCUMENTS

| | | |
|---|---|---|
| EP | 1127609 A2 | 8/2001 |
| JP | 61120803 A2 | 6/1986 |
| JP | 2001146503 A | 5/2001 |
| KR | 100656260 B1 | 12/2006 |

OTHER PUBLICATIONS

Database WPI Week 200772 Thomson Scientific, London, GB; AN 2007-771940.
Hagberg, C.G., "Process Machinery", Parts I and II, Rubber World, Mar. and Apr. 2000.
International Search Report from International Application PCT/EP2011/054455 dated Jun. 24, 2011, 3 pages.

* cited by examiner

Primary Examiner — Terressa Boykin
(74) Attorney, Agent, or Firm — Jennifer R. Seng

(57) ABSTRACT

The present invention relates to water and solvent-free polymers, in particular water and solvent-free synthetic rubber products like styrene butadiene rubber products and butadiene rubber products as well as a process for the production thereof. The invention further relates to a device suitable to accomplish said process.

53 Claims, 11 Drawing Sheets

PROCESS FOR THE PRODUCTION OF WATER AND SOLVENT-FREE POLYMERS

The present invention relates to water and solvent-free polymers, in particular water and solvent-free synthetic rubber products like non-halogenated and halogenated butyl rubber, modified and non modified poly butadiene rubber and poly styrene butadiene rubber products as well as a process for the production thereof. The invention further relates to a device suitable to accomplish said process.

Synthetic rubbers have important industrial uses and are typically produced by the (co)polymerization of monomers, which is typically carried out via slurry, emulsion or solution processes. Examples of synthetic rubbers include butyl rubbers and halogenated butyl rubbers, polyisobutylene, ethylene propylene diene M-class rubbers (EPDM), nitrile butadiene rubbers (NBR) and styrene-butadiene rubbers (SBR) and Poly butadiene rubbers (PBR).

After the (co)polymerization, the reactor discharge mixture contains at least the polymer, solvents, residual monomers and the catalyst. To recover the polymer, the discharge stream is typically treated with steam and hot water. Most of the solvent and the unreacted monomers are thereby flashed off. One disadvantage of the contact with steam and water is, that synthetic rubbers are coagulated. The rubber polymers are then present in the form of wet crumbs in water. Most of the water is then be separated by draining, followed e.g. by the application of drying extruders and a final vacuum drying step.

Polymerization of butadiene with different catalysts (e.g. Nd, Co, Li, Ni, Ti) leads to poly butadiene rubber with different physical properties depending on the catalyst system as on the reaction process. The copolymerization of styrene and butadiene can also be accomplished by using similar reaction conditions. In the following text poly butadiene rubbers and styrene butadiene rubbers from a solution process (SSBR) will be summarized as butadiene rubber polymers. The polymeization for example is carried out industrially at temperatures of approximately 30° C. to +150° C. to obtain high molar masses. The solution process uses inert hydrocarbon as a solvent. After the polymerization, the butadiene rubber polymer is present as a homogeneous solution in a hydrocarbon. Unreacted monomers can also be present in the reactor discharge mixture. The butadiene rubber polymer needs to be recovered and isolated from the solvent.

In the solution process, the polymerization reactor discharge stream is flashed. Additives might be added for adjustment of physical properties. Thereafter the polymer stream is treated with steam and hot water in a flash drum. While the butadiene rubber polymer is coagulated to crumbs, most of the solvent and the unreacted monomers are thereby flashed off and the water is separated from the vapors by condensation. The stripping stage is applied to remove remaining monomer residues and solvent residues.

The slurry of water and poly butadiene rubber crumbs is then converted into the final commercial bale form through further drying. The drying is typically effected by draining, followed by the application of drying extruders and a final drying step in a fluidized bed, or hot air dryer or similar dryers e.g. spiral conveyor.

Additives can also be incorporated at that stage.

The aforementioned processes for coagulation and steam stripping suffer from very high energy consumption. A large amount of steam is necessary not only to evaporate the solvent but also to heat and maintain the complete water content of the stripping drums at a high temperature. Additional steam addition is also necessary to strip off residual amounts of solvent by lowering the partial pressure of the solvent in the stripping drum.

The aforementioned processes also utilize a large amount of water because the concentration of butadiene rubber in the slurry after coagulation is generally only 5 to 12% by weight. The water from this slurry can be partially recycled and partially constitutes waste water and must be disposed off.

The rubber crumbs are separated from the bulk water mechanically using simple sieve trays or screens. The butadiene rubber still contains approximately 20 to 50% water after this first separation. Further mechanical drying is then conducted using extruders by kneading the product and squeezing out the water. The disadvantage of this mechanical drying process is the contamination of water by small rubber particles that were not held back by the sieves with the result that the waste water requires additional treatment.

The aforementioned mechanical dewatering can only diminish moisture content down to approximately 5 to 15%. Additional thermal drying stages are then required. The rubber is thereby heated to 130 to 200° C. under pressure in a single screw or twin screw extruder. A die plate is installed to maintain the pressure. When the rubber is pushed through the die plate, the water in the rubber evaporates and forms open porous crumbs. The crumbs are conveyed to a convective dryer where residual moisture is removed by hot air. After such drying, the butadiene rubber generally has a moisture content of 0.1 to 0.8%. A cooling stage, accomplished by flowing cold air through the rubber crumbs, is then needed to cool the butadiene rubber crumbs down to the maximum baling temperature of 60° C. The crumbs are then formed into bales by hydraulic presses, and the bales are packed into boxes or crates for shipment.

The aforementioned processes for drying butadiene rubbers is complex and requires extensive equipment.

Various other special processes have been developed with the aim of removing water and volatile organic solvents from polymers. Extruder degassing in vacuum with or without the use of entrainers has gained acceptance in practical applications as the most important technique, however, the energy requirements of such prior art processes are quite high.

U.S. Pat. No. 3,117,953 A1 discloses an apparatus and process for purifying high pressure polyethylene. The substitution of synthetic rubber cement for polyethylene in U.S. Pat. No. 3,117,953 A1 would, however, result in crumbs being formed prior to entering the extruder, which is not desirable at all.

DE 195 37 113 discloses a method and an apparatus for polymer resins in particular polycarbonate resins using a steam stripper a decanter and an extruder. However, the introduction of steam would result in an undesireable high content of residual water or a very high energy consumption.

U.S. Pat. No. 4,055,001 discloses a method for the preparation of polymers such as butyl rubber having a water content of less than 0.1 wt.-% by using ultrasound sonotrodes during the drying process. However, the very high shear stress associated with the use of ultrasound is prohibitive for polymers such as halobutyl rubbers.

EP 0 102 122 discloses a method for polymer recovery from a solution, in particular for recovery of polyethylene, using a partially filled extruder. However, EP 0 102 122 is silent about the removal of residual water.

US 2001/056176 A1 discloses a one step method of recovering a polymer and specifically an example for the concentration of rubber solutions. The rubber solution is thereby heated with steam in order to remove existing solvents in one step by degassing under vacuum to produce white crumb.

US 2001/056176 A1 thereby requires a large volumetric vapor flow to remove the volatile components at low vapor pressure and results in the enclosure of additional water in the crumbs, which water would subsequently need to be removed.

U.S. Pat. No. 5,283,021 A1 discloses a two step process for removing solvent from an elastomeric polymer solution. The polymer solution is thereby heated directly by a heating fluid and sprayed under vacuum. During the spraying, the solvent is evaporated, thereby forming crumbs which are then fed to an extruder for further degassing. However, crumb formation at that stage is not desirable.

EP 1 127 609 A2 discloses a process to treat a product in at least one kneader. EP 1 127 609 A2 uses energy introduced in part through the wall of the kneader itself to evaporate the solvent from solutions containing elastomers and thermoplastics. A kneader with a large surface area is therefore required as are high investment costs. Another portion of the energy is introduced via the rotating shaft of the kneader as mechanical energy. Mechanical energy is more expensive and therefore environmentally disadvantageous when compared to steam heating. The kneaders used in EP 1 127 609 A2 require a great deal of maintenance and cleaning. The introduction of mechanical energy via the kneader is furthermore strongly dependent on the viscosity of the product, which reduces the flexibility of the process.

EP 1 165 302 A1 discloses a device and method for degassing plastics. The apparatus in EP 1 165 302 A1 is an extruder with a rear vent and several vent sections operated under vacuum. The vacuum is needed to achieve low residual volatile concentrations. EP 1 165 302 A1 discloses that a stripping agent can be applied to further improve degassing efficiency. The plastic used in EP 1 165 302 A1, the thermoplastic polycarbonate, remains a flowing melt at the end of the degassing process. A synthetic rubber cement processed pursuant to EP 1 165 302 A1 would, however, convert to crumbs at the end of the degassing stage and could not be processed further.

In "Process Machinery", Parts I and II, March and April 2000; Author: C. G. Hagberg, a direct volatilization of rubber solutions using a flash tank and an extruder is disclosed. However, this reference is silent about the contents of volatile compounds in the final product.

JP61120803 describes the removal of a solvent by using an extruder having a vent mechanism to produce a rubber masterbatch based on mixture of a rubber solution containing dispersed fillers.

In view of the foregoing, an object of the present invention was therefore to provide a continuous, energy efficient, ecologically and economically favourable process to remove volatile compounds from a fluid containing at least one polymer, preferably at least one synthetic rubber, producing a polymer product that is substantially free of volatile compounds.

This object is solved by a process of removing volatile compounds from a fluid (F) containing at least one non-volatile polymer and at least one volatile compound which comprises at least the steps of:
a) treating the fluid (F) in at least one concentrator unit comprising at least a heater, a degassing vessel (4) and a vapor line, whereby the fluid (F) is heated, the heated fluid (G) is fed into a degassing vessel where part of the volatile compounds are removed via the vapor line to obtain a concentrated fluid (H),
b) reheating the concentrated fluid (H) from step a) in at least one reheating unit to obtain a reheated concentrated fluid (L);
c) feeding the reheated concentrated fluid (L) from step b) into at least one extruder unit comprising at least an extruder degassing section comprising at least a conveying section, a vent port with one or more vapor lines, a accumulating section and an outlet section, whereby volatile compounds are removed through the vent ports and vapor lines;
whereby the reheated concentrated fluid (L) is free-flowing upon entering the extruder degassing section and the product (P) obtained at the outlet section is substantially free of volatile compounds.

Preferably, the process could comprise further steps, as follows:
d) feeding the concentrated fluid (H or L) from step a) or b) into at least one kneader unit comprising at least a degassing section, a vent port with one or more vapor lines, and an outlet section, whereby volatile compounds are removed through the vent ports and vapor lines to obtain a high viscous fluid (N);
e) feeding the high viscous fluid (N) from step d) into at least one extruder unit comprising at least an extruder degassing section comprising at least a conveying section, a vent port with one or more vapor lines, a accumulating section and an outlet section, whereby volatile compounds are removed through the vent ports and vapor lines;
f) feeding the high viscous fluid (N) from step d) into at least one kneader unit comprising at least a degassing section, a vent port with one or more vapor lines, and an outlet section, whereby volatile compounds are removed through the vent ports and vapor lines;
whereby the reheated concentrated fluid (L) is free-flowing upon entering the extruder degassing section and the product (P) obtained at the outlet section is substantially free of volatile compounds to obtain a high viscous fluid.

It is pointed out that the scope of the invention also encompasses any desired combinations of the ranges and areas of preference specified for each feature.

In the context of this invention, the term "free-flowing" means a viscosity in the range of 500 to 50.000.000 mPa*s, preferably 5.000 to 30.000.000 mPa*s and most preferably 10.000 mPa*s to 300.000 mPa*s.

As far as not mentioned otherwise the viscosity values of fluids refer to the zero shear viscosity extrapolated from measurements at given temperature using a Haake Rheostress RS 150 viscosimeter or a rotational rheometer of cone-plate type for very viscuous samples.

In the context of this invention, the term "substantially free of volatile compounds" means a total concentration of volatile compounds of less than 1 wt %, preferably less than 0.5 wt % based on the mass of the non-volatile polymer.

In particular, the term "substantially free of volatile compounds" means substantially free of water and substantially free of volatile organic compounds.

Non-volatile polymers are considered to be substantially free of water, if the residual water concentration is less than 0.5 wt % preferably less than 0.25 wt %, more preferably less than 0.1 wt % and most preferably less than 0.075 wt % based on the mass of the polymer.

In the context of this invention, the term "volatile organic compounds" means organic compounds having a boiling point of below 250° C. at standard pressure.

Non-volatile polymers are considered substantially free of volatile organic compound, if the residual concentration of said volatile organic compounds is less than 0.75 wt % preferably less than 0.25 wt % and most preferably less than 0.1 wt % based on the mass of the polymer. Said volatile organic compounds are typically the solvents employed in the polymerization or subsequent processing steps like a halogenation step and include hydrocarbons like hexanes and pentanes.

Preferred non-volatile polymers are synthetic rubber products.

In the context of this invention, the term synthetic rubber products includes butyl rubbers and halogenated butyl rubbers, polyisobutylene, ethylene propylene diene M-class rubbers (EPDM), nitrile butadiene rubbers (NBR) and styrene-butadiene rubbers(SBR) as well as butadiene rubbers. Preferred synthetic rubber products are styrene butadiene rubbers and butadiene rubbers like Lithium catalyzed butadiene rubber, Nickel catalyzed butadiene rubber, Titanium catalyzed butadiene rubber, Cobalt catalyzed butadiene rubber and Neodymium catalyzed butadiene rubber whereby Neodymium catalyzed butadiene rubber is even more preferred.

The mass average molecular weight of styrene butadiene rubber molecules and butadiene rubber molecules Mw is typically between 50,000 and 1,000,000 g/mol, preferably between 150.000 and 400,000 g/mol.

The subject of the invention will be described in more detail by means of schematic drawings in which.

Figure 1:
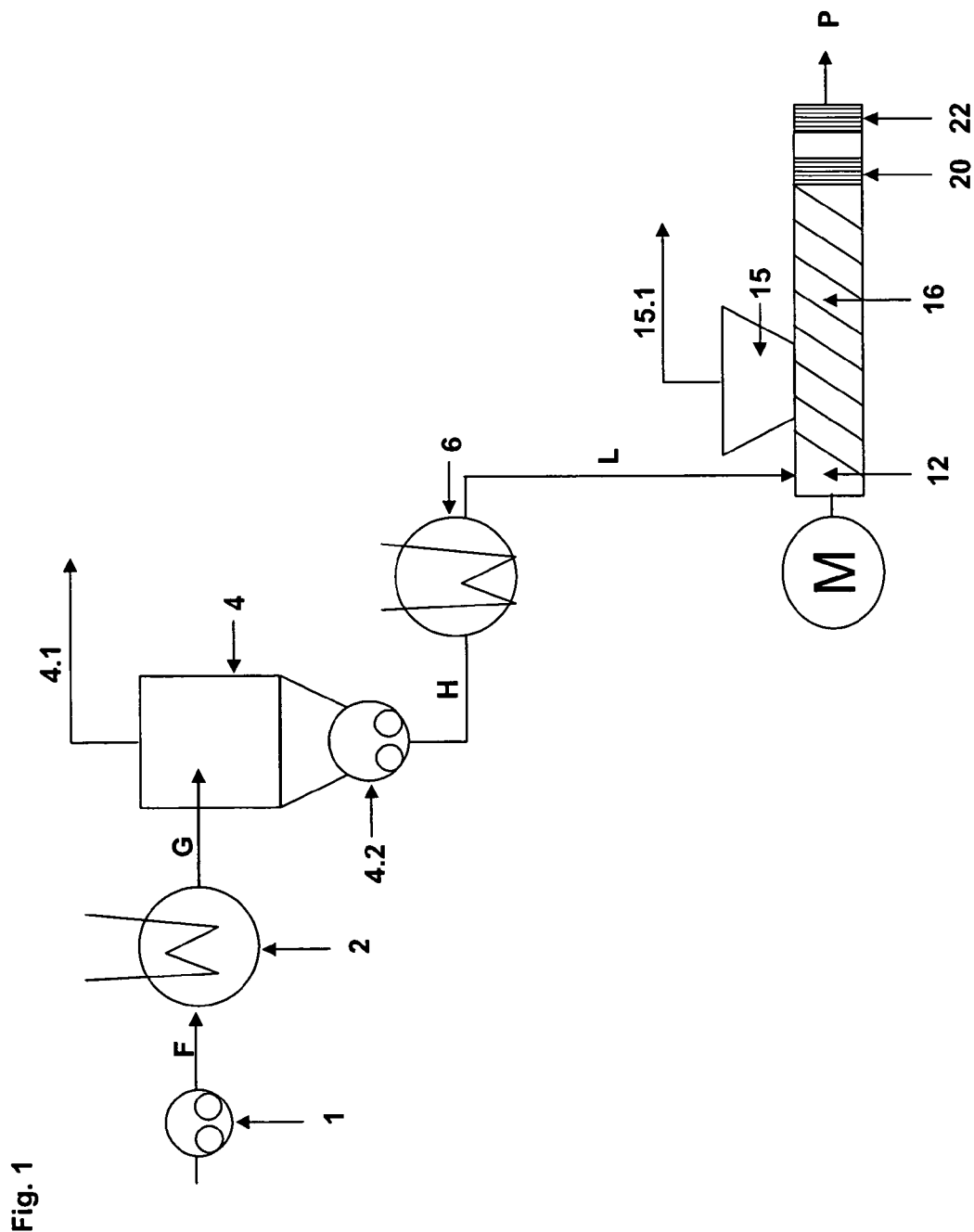
FIG. 1 shows a single-stage concentrator unit, a reheating unit and an extruder unit comprising one extruder degassing section, one accumulating section and one outlet section.

A basic and exemplary embodiment of the process step is shown in FIG. 1. In step a) Fluid F containing at least one non-volatile polymer and at least one volatile compound is transferred via pump 1 to the heater 2, where the fluid F is heated.

Fluid F, also called cement, contains for example from 3 to 50 wt % of a non-volatile polymer, preferably a synthetic rubber and more preferably a butadiene rubber and from 60 to 97 wt % volatile compounds, in particular a solvent or a solvent and water, whereby the aforementioned components add up to 90 to 100, preferably 95 to 100 wt % of the total mass of fluid F.

The solvent is preferably selected from the group consisting of linear or branched alkanes having between 3 and 10 C atoms, preferably 3 to 7 C atoms. More preferred solvents are iso-butene, n-pentane, iso-pentane, n-hexane, cyclo-hexane, iso-hexane, methyl-cyclopentane, methyl-cyclohexane and n-heptane as well as mixtures comprising or consisting of those alkanes.

In a preferred embodiment of the invention, fluid F contains from 3 to 40 wt % of a non-volatile polymer, preferably a synthetic rubber and more preferably butadiene rubber, from 60 to 95 wt % volatile organic compounds, in particular a solvent, and from 0.5 to 20 wt % water, whereby the aforementioned components add up to 95 to 100 wt % of the total mass of fluid F.

The fluid F is typically obtained from polymerization processes or subsequent processing steps. Fluids F containing water are typically obtained after steam stripping processes following the polymerization.

The fluid F entering the heater typically and preferably has a temperature of 10° C. to 100° C., preferably of 30° C. to 80° C. The viscosity of fluid F is for example in the range of 100 mPa*s to 90,000 mPa*s, preferably in the range of 500 mPa*s to 60,000 mPa*s.

A heater may be any device that is able to raise the temperature of Fluid F. In a preferred embodiment, heater 2 is a heat exchanger. The heating medium is selected from the group consisting of steam, heating oil or hot pressurized water. The heat exchanger is for example of shell-and-tube type, where the fluid F is inside the tubes and the heating medium is on the shell side. Special inserts in the tubes may be applied to enhance heat transfer. Another type of heat exchanger may also be used, in which fluid F is on the outside of the heat exchanger tubes. The advantage of the aforementioned types of heat exchangers is the avoidance of maldistribution and easy maintenance as well as good heat transfer. Said heat exchangers are well known and commercially available. In a less preferred embodiment Plate type heat exchangers may also be applied.

Upon heating, heated fluid G is obtained. The heated fluid G has a higher temperature than fluid F, preferably a temperature of 100 to 200° C., more preferably 110° C. to 190° C. and even more preferably 120° C. to 175° C. The heated fluid G is then conveyed further into a degassing vessel 4. In the degassing vessel, the volatile compounds at least partially evaporate. The vapors are separated and removed from the heated fluid G by a vacuum line 4.1. The pressure in the degassing vessel 4 is for example in the range of 100 hPa to 4,000 hPa, preferably in the range of 200 hPa and 2,000 hPa and more preferred in the range of 230 to 1,100 hPa.

The vapors removed via the vacuum line 4.1 are preferably condensed and recycled into the process for preparation of fluid F. After degassing and separation a concentrated fluid H is obtained, which is removed from the degassing vessel 4 by means of a pump 4.2.

In a preferred embodiment of the invention the degassing vessel is designed in the shape of a cyclone to further aid separation of vapor from heated fluid G. In another preferred embodiment of the invention the degassing vessel 4 has a conical or at least torisperical shaped bottom, to allow the vessel being emptied completely or substantially complete.

The pump 4.2 is preferably directly connected to the outlet of the degassing vessel 4. In general, the connection piece between pump and vessel is preferably as short as possible.

Due to the high viscosity of the concentrated fluid H at this stage, the inlet of the pump is preferably designed with a large inlet, thereby reducing the pressure drop at the inlet.

The pump 4.2 may be selected from the group consisting of positive displacement type pumps, gear pumps, piston pumps, membrane pumps, screw type pumps, extruder type pumps like counter-rotating or co-rotating single or twin screw extruders or kneader type pumps. Positive displacement type pumps and gear pumps are preferred, gear pumps are even more preferred.

In another preferred embodiment the pump 4.2 comprises a combination of an extruder or a kneader and a gear pump whereby the gear pump is fed from the extruder or kneader.

The amount of volatile compounds that is removed in this step a) is for example dependent on the temperature of fluid G and the pressure in the degassing vessel 4. In a preferred embodiment of the invention the temperature of fluid G and the pressure in the degassing vessel 4 are chosen so that the concentrated fluid H is still free-flowing as defined above and comprises for example from 10 to 60, preferably from 20 to 60 wt % of a non-volatile polymer, preferably a synthetic rubber and more preferably butadiene rubber and from about 40 to about 90, preferably from 40 to 80 wt % volatile compounds whereby the aforementioned components non-volatile polymer, volatile organic compound and water add up to 90 to 100 wt %, preferably to 95 to 100 wt % of the total mass of fluid H.

In a preferred embodiment and where the feedstock fluid F comprises water, fluid H for example comprises from 10 to 60, preferably from 20 to 60 wt % of a non-volatile polymer, preferably a synthetic rubber and more preferably butadiene rubber, from about 25 to about 90, preferably from 25 to 75 wt % volatile organic compounds, in particular a solvent, and about 0.5 to about 15 wt % water, whereby the aforementioned components non-volatile polymer, volatile organic compound and water add up to 90 to 100 wt %, preferably 95 to 100 wt % of the total mass of fluid H.

The temperature of the concentrated fluid H is lower than that of heated fluid G and is for example in the range of 15 to 100° C., preferably in the range of 30 to 100° C. The concentrated fluid H is still free-flowing as defined above.

In step b), the concentrated fluid H obtained in step a) is then passed through a reheating unit 6 to obtain a reheated concentrated fluid L. The a preferred embodiment the reheating unit comprises a heat exchanger, whereby the same disclosure including the preferences with regard to heating media and heat exchanger types apply as described above for heat exchanger 2.

The temperature of the reheated concentrated fluid L is higher than that of the concentrated fluid L and is for example in the range 50° C. to 200° C., preferably in the range of 90° C. to 180° C. The reheated concentrated fluid L is still free-flowing as defined above.

In step c), the reheated concentrated fluid L obtained in step b) is passed on to a extruder unit and fed into the conveying section 16 of the extruder degassing section at the feeding point 12.

Suitable extruder types include single screw and multi-screw extruders comprising any number of barrels and types of screw elements and other single or multishaft conveying kneaders. Possible embodiments of multiscrew extruders are twin-screw extruders, ring extruders or planetary roller extruders, whereby twin-screw extruders, multishaft conveying kneaders and planetary roller extruders are preferred.

Single screw extruders include those having an axial oscillating screw. Twin screw extruders are for example counter-rotating intermeshing, counter-rotating non-intermeshing, co-rotating intermeshing and co-rotating non-intermeshing twin screw extruders, whereby co-rotating intermeshing twin screw extruders are preferred.

In one embodiment of the invention the extruders can either be heated via the barrels to temperatures up to 300° C. or cooled.

In a preferred embodiment, the extruder comprises means to operate separate zones independently of each other at different temperatures so that the zones can either be heated, unheated or cooled. In another preferred embodiment the extruder comprises for each conveying section at least one separate zone, which can be operated independently at different temperatures.

Preferred extruder materials should be non-corrosive and should substantially prevent the reheated concentrated fluid L and the Product P from being contaminated with metal or metal ions. Preferred extruder materials include nitrided steel, duplex steel, stainless steel, nickel-based alloys, composite materials like sintered metals, hot isostatic pressed materials, hard wear resistant materials like Stellite, coated metals with coatings for example made from ceramics, titanium nitride, chromium nitride and diamond like carbon (DLC).

The conveying section 16 is open to a vent port 15. In the conveying section 16 a part of the solvent is evaporated and separated from the reheated concentrated fluid L. The vapors are removed through the vent port 15 via a vapor line 15.1.

Since the evaporation volatile compounds have a tendency to entrain the reheated concentrated fluid L or the Product P towards the vent ports, in a preferred embodiment of the invention the vent ports 15 are designed to prevent the material, in particular the reheated concentrated fluid L or the Product P, from coming out of the vent ports.

Suitable means to accomplish that purpose are stuffer srews, that are mounted on the vent ports and convey any material back into the extruder, or rollers or belts, that are applied to the inside of the vent ports to push deposited material back into the extruder. As an alternative or in addition to the aforementioned, coatings of the vent ports may be applied which reduce or prevent sticking of the material to the surface. Suitable coatings include DLC, Ethylene-Tetrafluoroethylene (ETFE), Polytetrafluoroethylene (PTFE) and Nickel-Alloys.

The pressure at the vent port 15 is for example between 1 hPa and 2,000 hPa, preferably between 5 hPa and 900 hPa.

The vapor line 15.1 may be and is preferably connected to a condensing system.

In general, the purpose of the condensing system is to collect volatile compounds removed by the vent ports via the vapour lines and typically comprises a condenser and a vacuum pump. Any condensing system known in the art may be used to effect the recovery of volatile compounds.

Generally, it is preferred to recycle the condensed volatile compounds, optionally after carrying out a phase separation to separate the volatile organic compounds from water, into a process for the preparation of fluid F.

The conveying section 16 is terminated by a accumulating section 20. The purpose of the accumulation is to assure a certain pressure level in the vent port 15 and to introduce mechanical energy into the material to facilitate evaporation of volatile compounds. The accumulating section 20 may comprise any means that enable the accumulation of the material. It may be designed to include for example kneading or throttling elements, blister discs or die plates.

Examples of throttling elements are conical or cylindrical flow paths or other throttling means.

The application of kneading elements, blister discs or die plates within the accumulating section is preferred, kneading elements are even more preferred. Examples of kneading elements include kneading blocks, which may be designed as double or triple flighted forward, backward or neutral conveying kneading blocks; single or double flighted screw mixing elements with grooves, single flighted tooth mixing elements, blister plates and single, double or triple flighted eccentric discs. The kneading elements may be assembled in any combination on the screw shafts of the extruder, in particular of an twin screw counter rotating or co-rotating twin screw extruder.

A typical accumulating section comprises of 2 to 10 kneading blocks, oftentimes terminated by a back conveying type of kneading element. For mixing in of a stripping agent, tooth type elements or screw elements with grooves may be applied.

Eccentric discs are preferably applied in the last section of the extruder, where the product P is highly viscous and substantially free of volatile compounds For planetary roller extruders, kneading elements like tooth shaped rollers are or rollers with grooves and clearances are preferred.

Generally the extruder unit may comprise one or more conveying sections and one or more accumulating sections, whereby the number is only limited by constructional constraints. A typical number of conveying sections and accumulating sections is 1 to 30, preferably 2 to 20 and more preferably 3 to 15.

The last accumulating section 20 is typically designed to form a product plug at the outlet of the extruder, thereby preventing surrounding air from entering the extruder. While passing from the conveying section 16 and the accumulating section 20 to the outlet section 22 the reheated concentrated fluid L undergoes a transition from the free-flowing reheated concentrated fluid L to the product P, which typically has a crumbly appearance.

The outlet section 22 typically comprises means to allow the product to exit the extruder and optionally but preferably product processing equipment. Examples of suitable product processing equipment includes combinations of die plates and cutters; die plates and underwater-pelletizing means; means for crumb formation like screw elements with teeth and holes; turbulators which may be designed as cylinders with holes in it, whereby the product is pressed from the outside to the inside of the cylinder, and whereby a rotating knife inside the cylinder cuts the product into pieces; fixed knives placed at the end plate of the extruder, whereby the screw rotation causes the cutting action, which preferably is applied when working with twin screw co-rotating, single screw and planetary roller extruders.

To reduce the mechanical and thermal stress to the product, in a preferred embodiment of the invention the product processing equipment is combined with cooling means.

The cooling means comprises any means that allow the removal of heat from the product. Examples of cooling means include pneumatic crumb conveyers with convective air cooling, vibrating crumb conveyers with convective air cooling, vibrating crumb conveyer with cooled contact surfaces, belt conveyer with convective air cooling, belt conveyer with cooled belts, water spraying on hot crumbs upon outlet of the extruder and as already mentioned underwater-pelletizing means, whereby water serves as the coolant.

The product P may then be processed further for final packing and shipping. (Halo)butyl rubber for example is cooled to a temperature of or below 60° C., formed into bales e.g. by a hydraulic press, and then packed into boxes or crates for shipment.

In general, an increasing feed rate of the reheated concentrated fluid L at the feeding point 12 requires a corresponding increase in the screw speed of the extruder. Moreover, the screw speed determines the residence time of fluid L. Thus, the screw speed, feed rate and the extruder diameter are typically interdependent. Typically the extruder is operated in such a manner that the dimensionless throughput $V/n*d^3$, wherein V denotes the Volume flow rate, n the screw speed expressed in revolutions per minute and d the effective diameter of the extruder is adjusted to about 0.01 to about 0.2 preferably to about 0.015 to about 0.1. The maximum and minimum feed rates and extruder screw speeds are determined by for example the size of the extruder, the physical properties of the synthetic rubber product contained in Fluid L and the target values of remaining volatile compounds. Given these properties, however, the operating parameters can be determined by one skilled in the art by some initial experiments.

In one embodiment of the invention the extruder is operated at a feed rate of 5 to 25,000, preferably of 5 to 10,000 kilograms per hour.

Generally, the degassing in the extruder may be aided by the addition of a stripping agent that is removed together with other volatile compounds. Even though the stripping agent may be added anywhere in the extruder unit, the addition in one or more accumulating sections is preferred. In a more preferred embodiment a stripping agent is added in one or more accumulating sections except the last one (20).

Suitable stripping agents are substances that are inert to the reheated concentrated fluid (L) and/or the product (P) and have a vapor pressure greater than 100 hPa at 100° C.

In the context of the invention, the term "inert" means that the stripping agent does not or virtually not react with the polymers contained in the reheated concentrated fluid (L) and/or the product (P). Suitable stripping agents are nitrogen, carbon dioxide, noble gases, propane, butane, water or a mixture of the aforementioned substances. The amount of stripping agent may be 0.0001 to 10, preferably 0.001 to 5 and more preferably 0.1 to 2 wt-% based on the amount of the polymer product obtained at the outlet section.

The invention further relates to a device suitable to accomplish the process according to the invention. Therefore the invention also encompasses a device comprising a least one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)

one heating unit (6) in communication with the pump (4.2) of the concentrating unit and a feeding point (12) on an extruder unit one extruder unit comprising at least one feeding point (12), one extruder degassing section (16), one accumulating section (20) and one outlet section (22), whereby the extruder degassing section (16) further comprises at least one vent port (15) connected to a vapour line (15.1).

In the context of this invention the term "in communication" includes direct or indirect connections whereby indirect connections may be accomplished for example via tubes or pipes. The term "in communication" further includes the option that between the units or means in communication further units or means are arranged.

Figure 2:
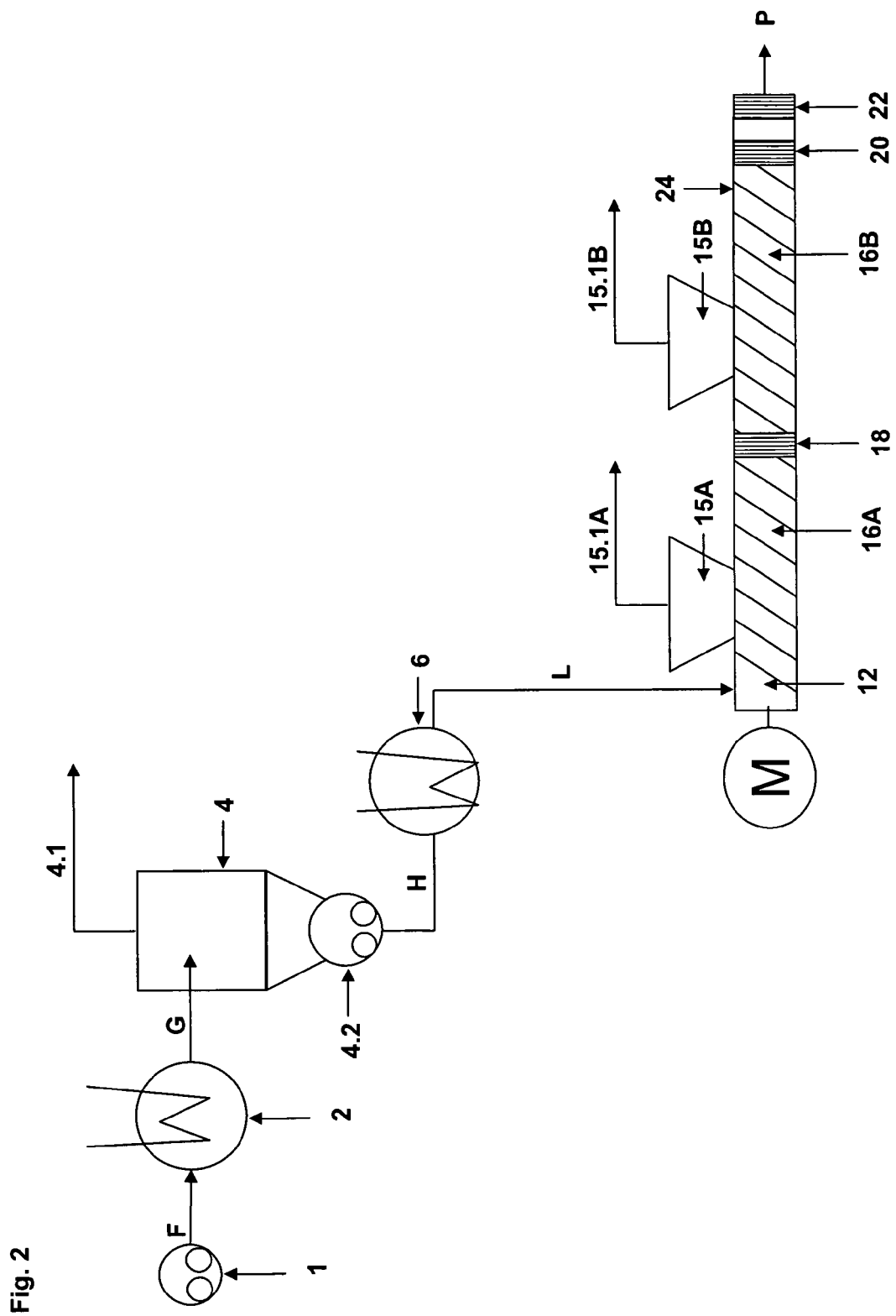
FIG. 2 shows a single-stage concentrator unit, a reheating unit and an extruder unit comprising two extruder degassing sections, two accumulating sections and one outlet section.

Another embodiment of the invention is shown in FIG. 2. FIG. 2 shows another flow chart and suitable device for the accomplishment of the process according to the invention comprising a concentrator unit with a pump 1, a heater 2, a degassing vessel 4, a vapour line 4.1 and a pump 4.2, a reheating unit comprising a heater 6 and an extruder unit comprising two extruder degassing sections having two conveying sections 16A and 16B each connected to a vent port 15 A and 15 B and a vapour line 15.1A and 15.1.B, two accumulating sections 18 and 20 terminating the conveying sections 16 A and 16 B a an outlet section 22. In addition to that the extruder unit further comprises a side feeder 24.

Generally, the extruder unit may comprise one or more side feeders, which may positioned anywhere in the extruder, preferably in close proximity to the feeding point or the outlet section 22. Side feeders are suitable for the addition of additives to the polymer.

Examples of additives, in particular for butadiene rubber products include stabilizing agents, acid scavengers like ESBO (epoxidized soy bean oil), stearates like calcium stearates, antioxidants, extender oils and the like. Examples of suitable antioxidants include sterically hindered phenols like butylhydroxytoluenes and its derivatives like Irganox 1010, 1076 and 1520, amines, mercapto-benzimidazoles, certain phosphites and the like.

As an alternative or in addition to that, additives may also already be added to the fluid F or, as far as they are liquid together with the stripping agent.

In a preferred embodiment of the invention step a) is repeated a least once, preferably once or twice. The advantage of repeating step a) is that the total energy consumption to produce the concentrated fluid H can significantly reduced due to easier operation parameter optimization for each concentration unit. The repetition of step a) is preferably accomplished by connecting the respective number of concentrating units in series.

Figure 4:
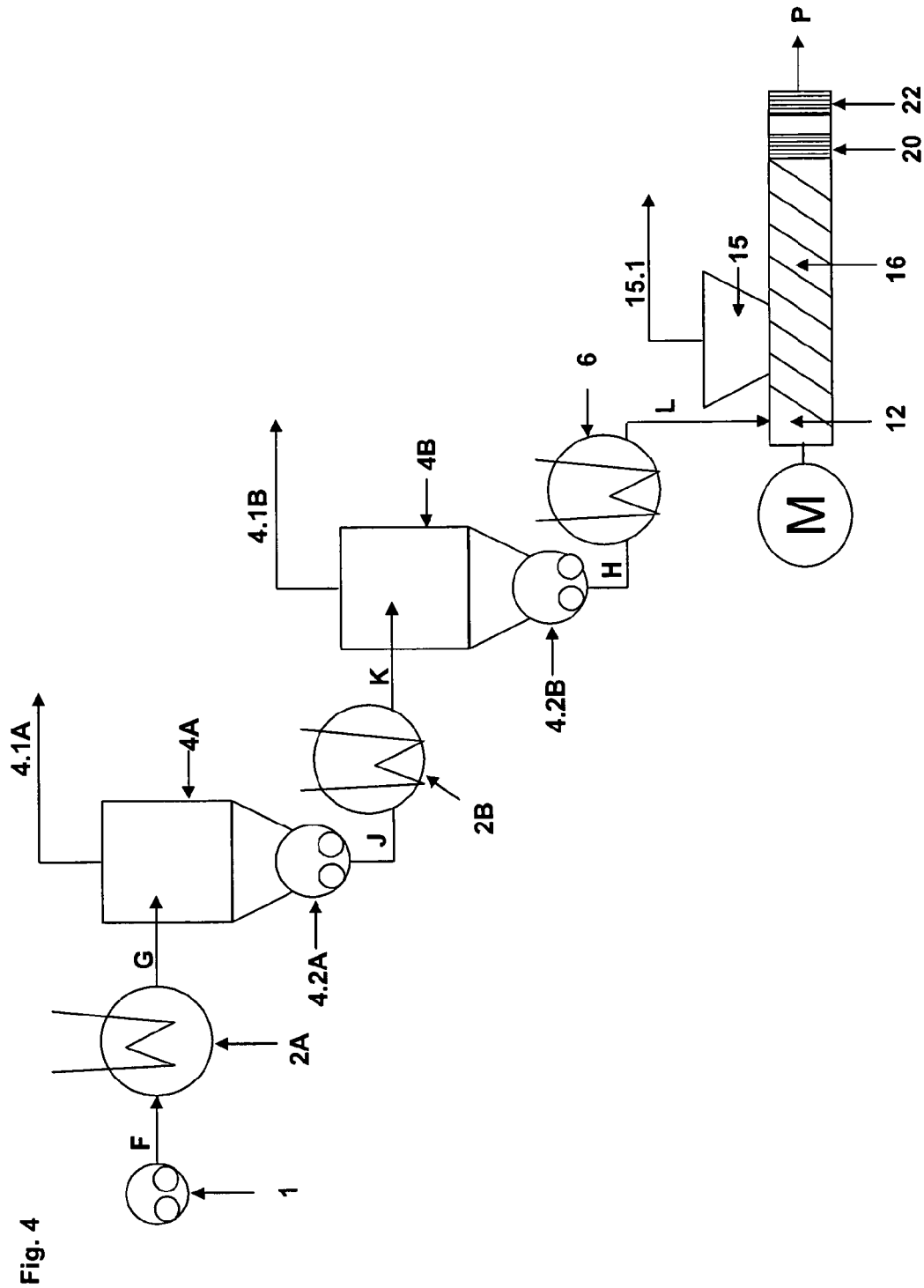
FIG. 4 shows a double-stage concentrator unit, a reheating unit and an extruder unit comprising one extruder degassing section, one accumulating section and an outlet section.

An example of this embodiment is shown in FIG. 4. FIG. 4 shows another flow chart and suitable device for the accomplishment of the process according to the invention comprising a double-stage concentrator unit with a pump 1, a first concentrator unit comprising heater 2A, degassing vessel 4A equipped with a vapour line 4.1A and a pump 4.2A, a second concentrator unit comprising heater 2B, degassing vessel 4B equipped with a vapour line 4.1B and a pump 4.2B, a reheating unit comprising a heater 6 and an extruder unit comprising two extruder degassing sections having two conveying sections 16A and 16B each connected to a vent port 15 A and 15 13 and a vapour line 15.1A and 15.1.B, two accumulating sections 18 and 20 terminating the conveying sections 16 A and 16 B a an outlet section 22. The heated fluid G is subjected to the first concentration stage, thereby obtaining pre-concentrated fluid J, which is then reheated by heater 2B to obtain the reheated pre-concentrated fluid K, which is then subjected to the second concentration stage, whereby concentrated fluid H is obtained. Concentrated fluid H is then processed further as described above.

In a preferred embodiment of the invention the concentration unit, the reheating unit or the extruder unit may independently of each other be equipped with one or more pressure regulation devices which allow the very precise operation of the units under predefined conditions.

The pressure regulation devices may be active or passive, whereby active pressure regulation devices are preferred. Examples of active pressure regulation devices include control valves like a pressure relief valve, examples of passive pressure regulation devices include nozzles and dies or orifice plates. Suitable valves may be selected from ball, piston, gate or needle valves.

In case of a passive pressure control device, it is preferred to calculate an orifice to cause a certain pressure drop. The calculation is based on viscosity of the fluid at that point and the throughput. Anyone skilled in the art can perform this calculation.

Active pressure control devices are typically controlled by a pressure measurement upstream of the device. The pressure is for example measured and compared to the set point. The pressure control device is then adjusted according to the offset recognized.

Alternatively the pressure drop across the device is measured instead of the absolute pressure upstream of the pressure control device. The valve position is adjusted manually, electrically, pneumatically or hydraulically. The control of the valve position, i.e. adjustment to the set point pressure, can for example be made manually or from any automated process control system.

Figure 3:
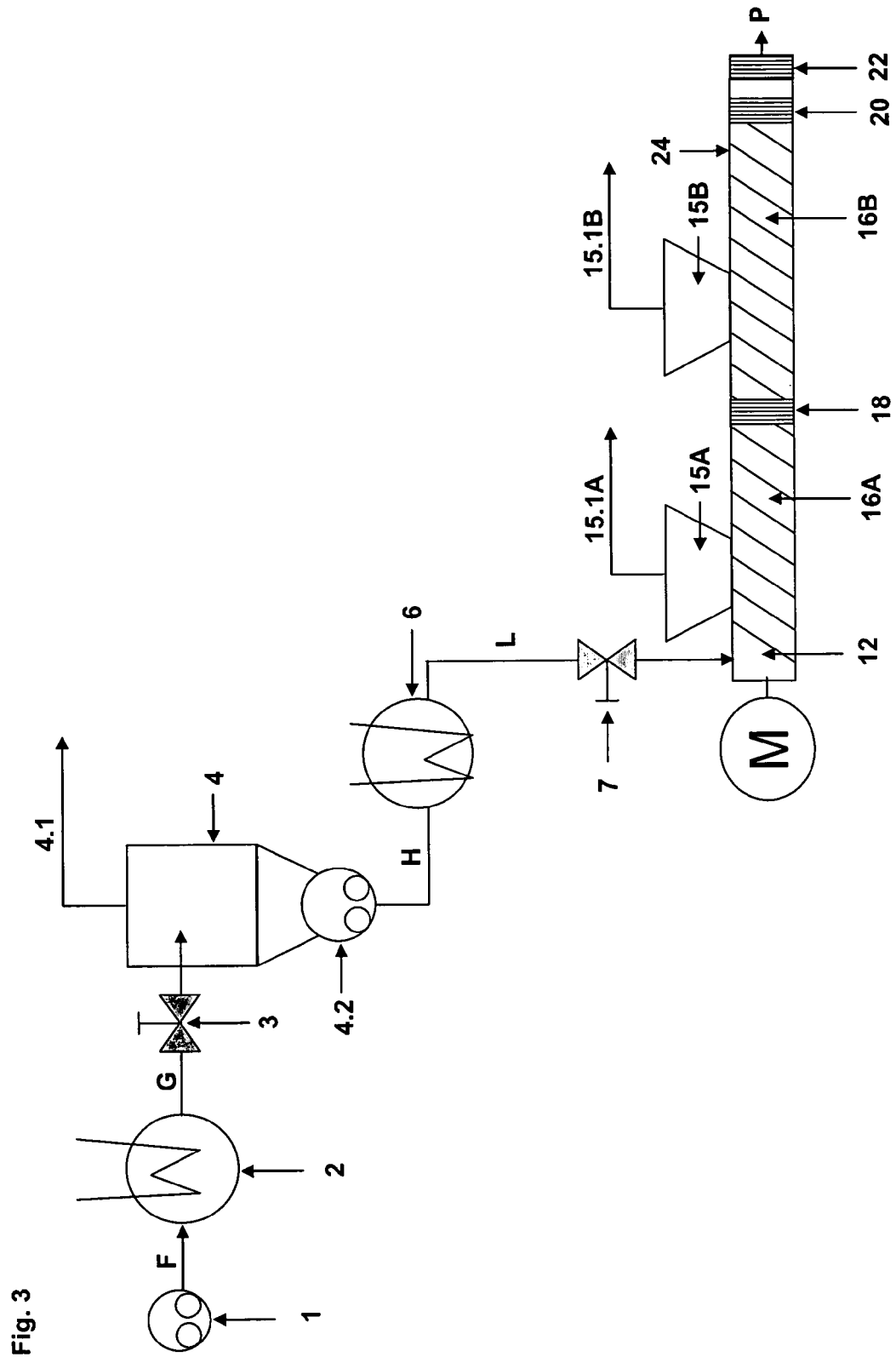
FIG. 3 shows a single-stage concentrator unit having a pressure relief valve, a reheating unit and an extruder unit having a pressure relief valve and further comprising two extruder degassing sections, two accumulating sections, a side feeder and an outlet section.

A further embodiment of the invention having additional pressure control devices is shown in FIG. 3 which is apart form the pressure control devices very similar to FIG. 2. The pressure of heated fluid G is controlled by the pressure control device 3, the pressure of reheated, concentrated fluid L entering the extruder is controlled by the pressure control device 7.

In a preferred embodiment of the invention the reheated concentrated fluid (L) is injected into the first extruder degassing section of the extruder unit, whereby the first extruder degassing section comprises one or more rear vent ports in upstream direction each connected to a vapor line.

The advantage of rear vent ports is that the volatile compounds present in the reheated concentrated fluid L undergo sudden and rapid evaporation, thereby effecting at least partial separation of the synthetic rubber product and the volatile compounds, the vapors emerging through the rear vents in upstream direction. Generally, from about 50 to about 99 wt-%, of the volatile compounds present in the fluid L is removed through the upstream vents.

Figure 5:
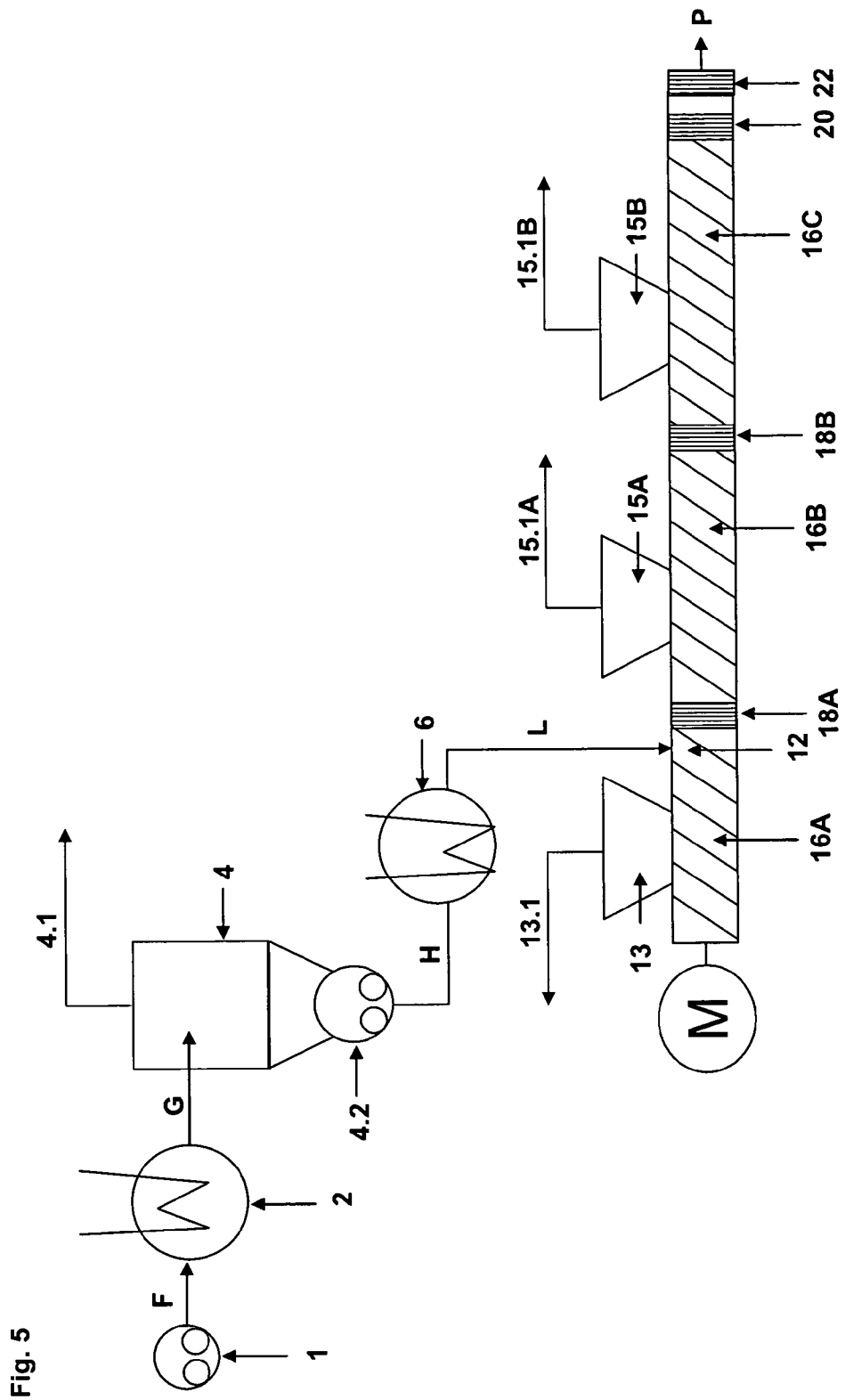
FIG. 5 shows a single-stage concentrator unit, a reheating unit and an extruder unit comprising three extruder degassing sections, three accumulating sections and one outlet section, whereby one extruder degassing section is a backward degassing section.

An example of this embodiment is shown in FIG. 5. FIG. 5 shows another flow chart and suitable device for the accomplishment of the process according to the invention comprising a single-stage concentrator unit with a pump 1, a concentrator unit comprising heater 2, degassing vessel 4 equipped with a vapour line 4.1 and a pump 4.2, a reheating unit comprising a heater 6 and an extruder unit comprising three extruder degassing sections, whereby the feeding point 12 is located at the first extruder degassing section, comprising a conveying section 16A, a rear vent port 13 connected to a vapor line 13.1 in upstream direction and whereby the extruder unit further comprises two downstream extruder degassing sections each comprising a conveying section 16 B and 16 C, a vent port, 15 A and 15B, whereby the vent ports 15A and 15B are each connected to a vapour line 15.1A and 15.1B, and whereby each of the conveying sections 16A, 16B and 16C is terminated by a accumulating section 18A, 18B and 20 and whereby the extruder unit further comprises an outlet section 22. Generally the streams are processed as described above with the difference being that large amounts of fluid compounds present in the reheated concentrated fluid L are already removed via vent port 13 and the vapour line 13.1 connected thereto.

Figure 6:
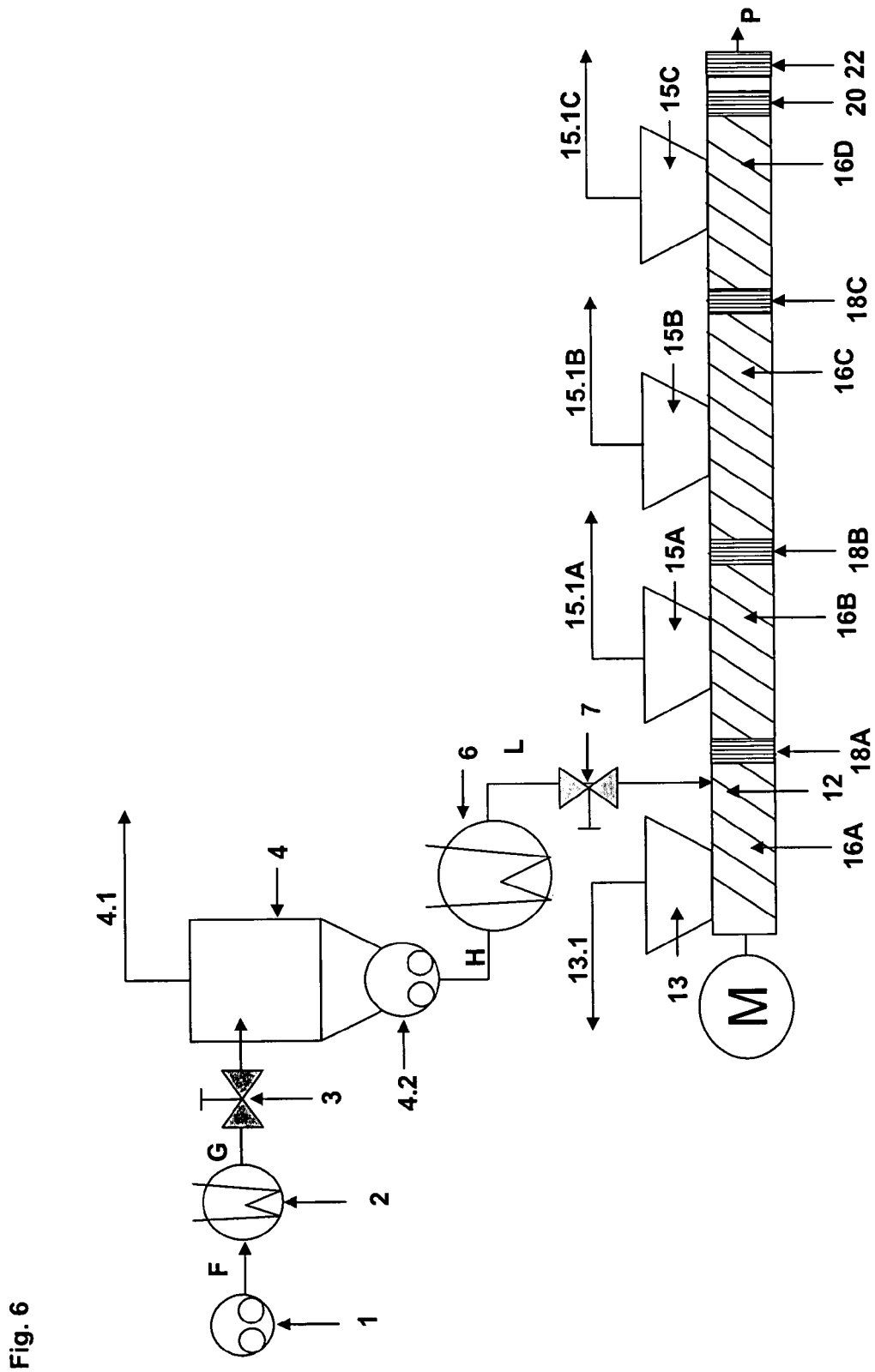
FIG. 6 shows a single-stage concentrator unit comprising a pressure regulation device, a reheating unit and an extruder unit comprising a pressure regulation device, four extruder degassing sections, four accumulating sections and one outlet section, whereby one extruder degassing section is a backward degassing section.

Another example of this embodiment is shown in FIG. 6. FIG. 6 shows another flow chart and suitable device for the accomplishment of the process according to the invention comprising a single-stage concentrator unit with a pump 1, a concentrator unit comprising a pressure control device 3, a heater 2, a degassing vessel 4 equipped with a vapour line 4.1 and a pump 4.2, a reheating unit comprising a heater 6 and an extruder unit comprising a pressure control device 7 upstream the feeding point 12 of the extruder, four extruder degassing sections, whereby the feeding point 12 is located at the first extruder degassing section, whereby the first extruder degassing section comprises a conveying section 16A, a rear vent port 13 connected to a vapor line 13.1 in upstream direction and whereby the extruder unit further comprises three downstream extruder degassing sections each comprising a conveying section, 16B, 16C and 16D, a vent port, 15A, 15B and 15C, whereby the vent ports 15A, 15B and 15C are each connected to a vapour line 15.1A, 15.1B and 15C, and whereby each of the conveying sections 16A, 16B, 16C and 16D is terminated by a accumulating section 18A, 18B, 18C and 20 and whereby the extruder unit further comprises an outlet section 22. Generally, the streams are processed as described above.

Fluid F, which is fed into the heater 2 typically, and as already disclosed above, contains for example from 3 to 50 wt % of a non-volatile polymer, preferably a synthetic rubber and more preferably a butadiene rubber and from 60 to 97 wt % volatile compounds, in particular a solvent or a solvent and water, whereby the aforementioned components add up to 90 to 100, preferably 95 to 100 wt % of the total mass of fluid F and in a preferred embodiment from 3 to 40 wt % of a non-volatile polymer, preferably a synthetic rubber and more preferably (halo)butyl rubber, from 60 to 95 wt % volatile organic compounds, in particular a solvent, and from 0.5 to 20 wt % water, whereby the aforementioned components add up to 95 to 100 wt % of the total mass of fluid F.

Dependant on the source of fluid F it further may contain hydrophilic compounds which need to be removed to a certain extend in order to met the desired product specifications.

Furthermore, where fluid F contains water, it is desirable to lower the water content in order to improve the process with respect to its energy consumption.

It was found that a significant reduction of remaining hydrophilic compounds or water or both can be achieved in an advantageous way by preparing the fluid F in a process of removing hydrophilic compounds and optionally water from a crude fluid A containing at least one non-volatile polymer, at least one volatile organic compound, one or more hydrophilic compounds and optionally water which comprises at least the step of pre a) treating the crude fluid (A) in at least one pre-washing unit comprising at least a separating apparatus (26), whereby the fluid (A) is mixed with water to obtain an organic phase (28) comprising primarily non-volatile polymer and volatile organic compounds and an aqueous phase (27) comprising primarily water and hydrophilic compounds, and whereby the organic phase (28) is separated from the aqueous phase (27) in a separating apparatus (26) and further used as fluid F and whereby at least a part of the aqueous phase (27) is removed from the separating apparatus (fluid C).

In the context of this invention the term "hydrophilic compounds" denotes at least partially water-soluble volatile and non-volatile compounds. Examples include inorganic salts and in particular residues of catalysts employed for the polymerization reaction like e.g. aluminum salts, iron or other transition metal salts or halides resulting from halogenation reactions and neutralizations.

Exemplary embodiments of step pre-a) are illustrated using FIGS. 8, 9, 10 and 11.

Figure 8:
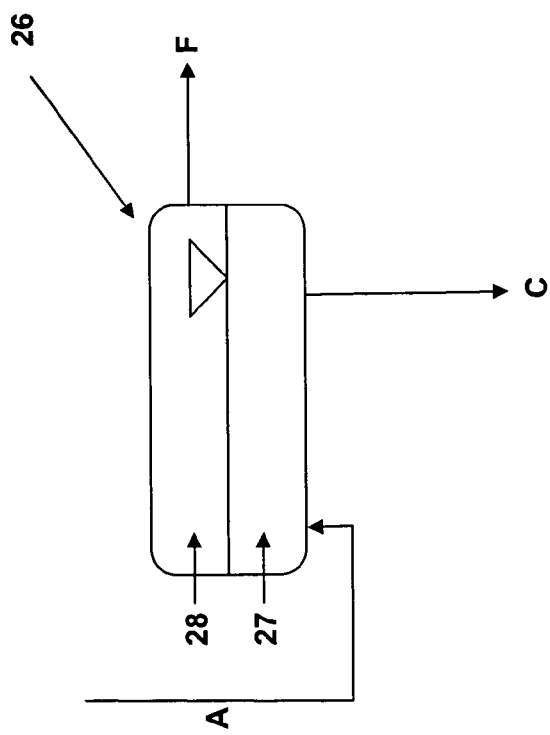
FIG. 8 shows a basic prewashing unit

A very basic and exemplary embodiment of the pre-washing step is shown in FIG. 8. In step pre-a) Fluid A containing at least one non-volatile polymer, at least one volatile compound and at least one hydrophilic compound is transferred to the separating apparatus 26, where it is mixed with water. Upon mixing with water an organic phase 28 and an aqueous phase 27 are obtained. The organic phase 28 is removed from the separating apparatus 26 and further used as fluid F, the aqueous phase 27 is at least partially removed from the separating apparatus 26 as fluid C, which is disposed of.

Figure 9:
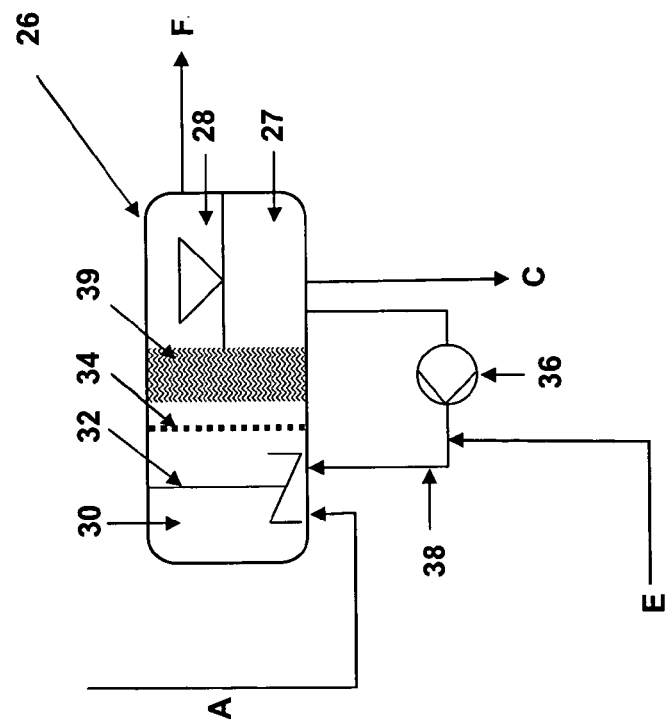
FIG. 9 shows a prewashing unit comprising a coalescer

An improved embodiment of the pre-washing step is shown in FIG. 9. In step pre-a) crude fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed and subjected to the subsequent process according to steps a) to c) as fluid F.

Generally, the coalescer in the pre-washing step is beneficial, but not mandatory. It helps to collect and coalesce the droplets and guides them to the phase interface which typically results in shorter residence times. Suitable examples of coalescers include structured or unstructured packings. Structured packings are for example flat plates, flat vanes, roof-shaped vanes and vanes with holes in vertical direction. The vanes or plates may be positioned rectangular or parallel to the main flow direction or with a slope. Unstructured packings are for example wire mesh, packings made of rings, spheres, cylinders, irregularly shaped geometries and weirs like distributor plates that have holes or slits, vertical plates covering a portion of the main flow path. The packings can be made of any technically feasible material, e.g. metals, glass, ceramic, coated metals, lined metals and polymeric materials like for example PTFE, ETFE, polyethylene (PE), polyetheretherketone (PEEK), Polypropylene (PP), polyamide (PA) and polyvinylidenfluoride (PVDF).

In a preferred embodiment of the invention step pre-a) is repeated at least once, preferably once.

Figure 10:
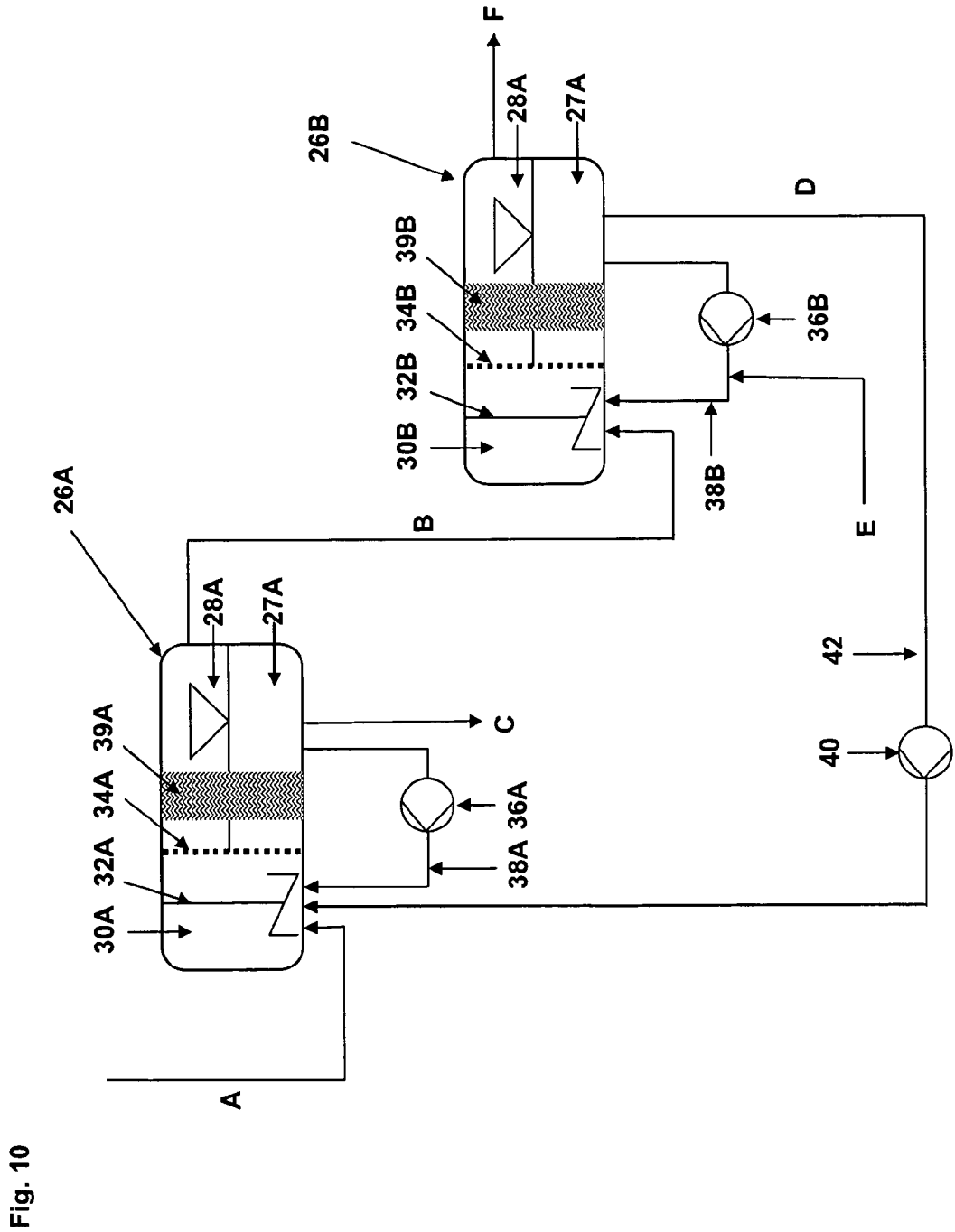
FIG. 10 shows a double-stage prewashing unit

A further improved and preferred embodiment of the pre-washing step is shown in FIG. 10. In step pre-a) of this double-stage prewashing step fluid A containing at least one non-volatile polymer, at least one volatile compound and at least one hydrophilic compound is fed to the mixing section 30A of a first separating apparatus 26A, which is equipped with a mixer 32A and passes through the separating wall 34A into a settling section, where the mixture separates into an aqueous phase 27A and an organic phase 28A, whereby the separation is supported by means of a coalescer 39A. A part of the aqueous phase 27A is removed from the separating apparatus 26A as fluid C, which is typically disposed of, with the rest being recycled via the recirculation line 38A by the action of recirculation pump 36A back into the mixing section 30A. The organic phase 28A is removed and fed as fluid B to the mixing section 30B of a second separating apparatus 26B, which is also equipped with a mixer 32B and passes through the separating wall 34B into a settling section, where the mixture separates into an aqueous phase 27B and an organic phase 28B, whereby the separation is supported by means of a coalescer 39B. A part of the aqueous phase 27B is recycled to the mixing section 30A of the first separating apparatus 26A as fluid D by the action of recirculation pump 40 and recirculation line 42, with the rest being enriched with fresh water E and recycled via the recirculation line 38B by the action of recirculation pump 36B back into the mixing section 30B of the second separating apparatus 26B. The organic phase 28 leaving the second separating apparatus 26B is subjected to the subsequent process according to steps a) to c) as fluid F. An advantage of this double-stage pre-washing step is that fluid F is substantially free of hydrophilic compounds and the amount of waste water is reduced due to recycling which results in higher concentration of hydrophilic compounds in fluid C.

In a preferred embodiment of the invention the separation is performed at temperatures of more than 40° C. The upper limit depends on the constitution of the polymer and the construction of the separating apparatus. Typically the upper limit is 125° C.

In a more preferred embodiment of the invention the separation is performed at temperatures of 40 to 110° C. preferably at temperatures of 80 to 110°.

Depending on the composition of fluid A and the boiling points of the components thereof, the separating apparatus may be designed to be operated under pressure.

Generally, the efficiency of the pre-washing step increases with increased temperature.

In another embodiment of the invention the organic phase 28 leaving the separating apparatus may be pre-heated to facilitate the free-flow of fluid F. This purpose can also be accomplished by a heater, whereby heat exchangers as disclosed for heater 2 above are preferred.

Figure 11:
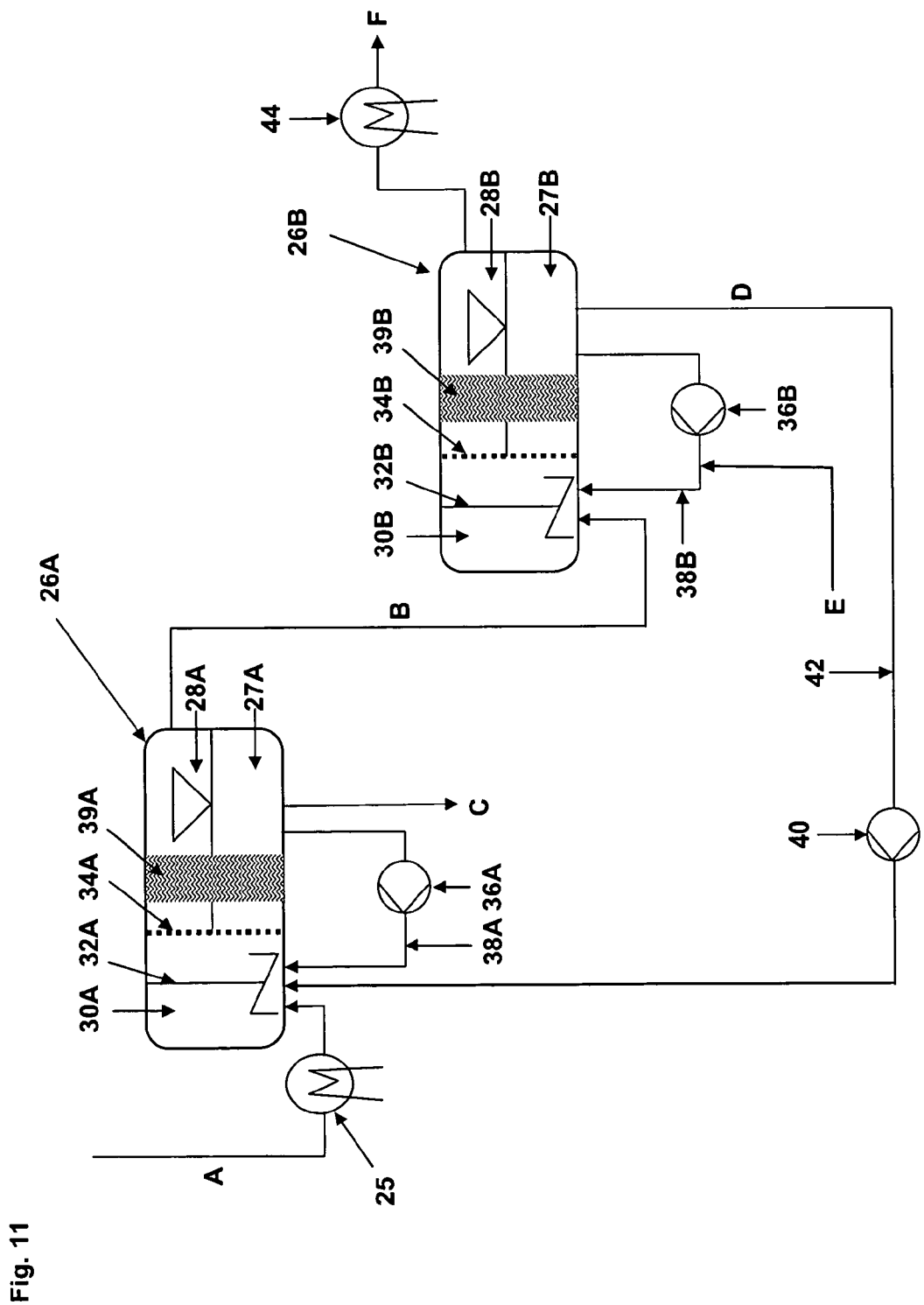
FIG. 11 shows a double-stage prewashing unit having additional heaters

A further improved and preferred embodiment having additional heaters for fluid A and fluid F is shown in FIG. 11 which is apart form the heaters identical to FIG. 10. Fluid A is heated before entering the separating apparatus by heater 25, the organic phase 28 leaving the second separating apparatus 26B is heated by heater 44.

It was further found that the performance of step pre-a) allows to significantly reduce the water content of fluid F compared to fluid A, which contributes to a significantly lower energy consumption for the subsequent steps a) to c).

Figure 7:
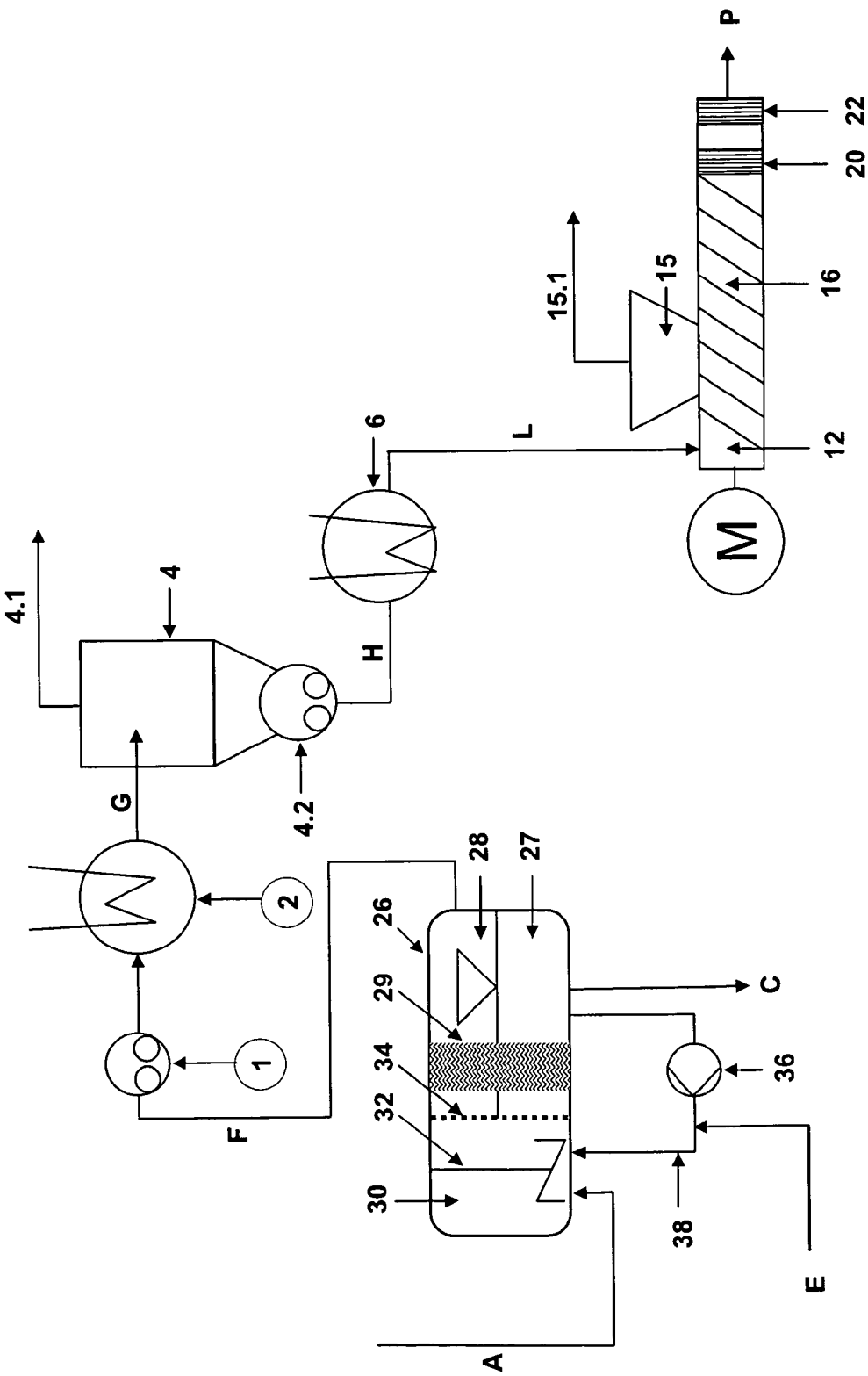
FIG. 7 shows a single-stage prewashing unit, a single-stage concentrator unit, a reheating unit and an extruder unit comprising one extruder degassing section, one accumulating section and one outlet section.

One further embodiment of the invention is shown in FIG. 7. FIG. 7 shows a basic flow chart and suitable device for the accomplishment of the process comprising the steps pre-a) and a) to c).

In step pre-a) fluid A containing at least one non-volatile polymer, at least one volatile compound and at least one hydrophilic compound is fed to the mixing section 30 of the separating apparatus 26, which is equipped with a mixer 32 and passes through the separating wall 34 into a settling section, where the mixture separates into an aqueous phase 27 and an organic phase 28, whereby the separation is supported by means of a coalescer 39. A part of the aqueous phase 27 is removed from the separating apparatus 26 as fluid C, which is typically disposed of, with the rest being enriched with fresh water E and recycled via the recirculation line 38 by the action of recirculation pump 36 back into the mixing section 30. The organic phase 28 is removed as fluid F. In step a) Fluid F is transferred via pump 1 to the heater 2, whereby heated fluid G is obtained. Heated fluid G is fed into the degassing vessel 4. The vapors emerging from the heated fluid G are separated and removed by a vacuum line 4.1. After degassing and separation a concentrated fluid H is obtained, which is removed from the degassing vessel 4 by means of a pump 4.2.

In step b), the concentrated fluid H obtained in step a) is then passed through a reheating unit 6 to obtain a reheated concentrated fluid L. In step c), the reheated concentrated fluid L obtained in step b) is passed on to a extruder unit and fed into the conveying section 16 of the extruder at the feeding point 12. The conveying section 16 is open to a vent port 15. In the conveying section 16 a part of the solvent is evaporated and separated from the reheated concentrated fluid L. The vapors are removed through the vent port 15 via vapor line 15.1. The conveying section 16 is terminated by a accumulating section 20. While passing from the conveying section 16 and the accumulating section 20 to the outlet section 22 the reheated concentrated fluid L undergoes a transition from the free-flowing reheated concentrated fluid L to the product P.

The invention is in particular advantageous in view of energy and fresh water consumption. The products obtained are free of volatile compounds.

The reference numerals used hereinbefore are summarized below:
1 pump
2, 2A, 2B heater
3 pressure control device
4, 4A, 4B degassing vessel
4.1, 4.1A, 4.1B vapor line
4.2, 4.2A, 4.2B pump
6 reheating unit
7 pressure control device
12 feeding point
13 rear vent port (upstream)
13.1 vapor line
15, 15A, 15B, 15B, 15C vent port (downstream)
15.1, 15.1A, 15.1B, 15.1C vapor line
16, 16A, 16B, 16B, 16C conveying section (downstream)
18, 18A, 1813, 18B, 18C accumulating section
20 last accumulating section
22 outlet section
25 heater
26, 26A, 26B separating vessel
27, 27A, 27B aqueous phase
28, 28A, 28B organic phase
30, 30A, 30B mixing section
32, 32A, 32B mixer
34, 34A, 34B separating wall
36, 36A, 36B recirculation pump
38, 38A, 38B recirculation line
39, 39A, 39B coalescer
40 recirculation pump
42 recirculation line
44 heater
A crude fluid A
C waste water
D aqueous phase for recycling
E fresh water
F fluid F
G heated fluid H
H concentrated fluid H
J pre-concentrated fluid J
K reheated pre-concentrated fluid K
L reheated concentrated fluid L
P product

The invention claimed is:

1. Process of removing volatile compounds from a fluid (F) containing at least one nonvolatile polymer and at least one volatile compound which comprise at least the steps of:
   a) treating the fluid (F) in at least one concentrator unit comprising at least a heater (2), a degassing vessel (4) and a vapor line (4.1), whereby the fluid (F) is heated, the heated fluid (G) is fed into a degassing vessel (4) where part of the volatile compounds are removed via the vapor line (4.1) to obtain a concentrated fluid (H),
   b) reheating the concentrated fluid (H) from step a) in at least one reheating unit (6) to obtain a reheated concentrated fluid (L);
   c) feeding the reheated concentrated fluid (L) from step b) into at least one extruder unit comprising at least an extruder degassing section comprising at least a conveying section (16), a vent port (15) with one or more vapor lines (15.1), a accumulating section (20) and an outlet section (22), whereby volatile volatile compounds are removed through the vent ports (15) and vapor lines (15.1);

d) feeding the concentrated fluid (H or L) from step a) or b) into at least one kneader unit comprising at least a degassing section, a vent port with one or more vapor lines, and an outlet section, whereby volatile compounds are removed through the vent ports and vapor lines to obtain a high viscous fluid (N);

e) feeding the high viscous fluid (N) from step d) into at least one extruder unit comprising at least an extruder degassing section comprising at least a conveying section, a vent port with one or more vapor lines, a accumulating section and an outlet section, whereby volatile compounds are removed through the vent ports and vapor lines;

f) feeding the high viscous fluid (N) from step d) into at least one kneader unit comprising at least a degassing section, a vent port with one or more vapor lines, and an outlet section, whereby volatile compounds are removed through the vent ports and vapor lines;

wherein the non-volatile polymers are synthetic rubber products, such as styrene butadiene rubbers and Lithium catalyzed butadiene rubber, Nickel catalyzed butadiene rubber, Titanium catalyzed butadiene rubber, Cobalt catalyzed butadiene rubber and Neodymium catalyzed butadiene rubber, Nickel catalyzed butadiene rubber, Titanium catalyzed butadiene rubber, Cobalt catalyzed butadiene rubber and Neodymium catalyzed butadiene rubber and, the reheated concentrated fluid (L) is free-flowing upon entering the extruder degassing section and the product (P) obtained at the outlet section (22) is substantially free of volatile compounds.

2. The process pursuant to claim 1, characterized in that the zero shear viscosity of the reheated concentrated fluid (L) is in the range of 500 to 50,000,000 mPa*s.

3. The process pursuant to claim 1 or 2, characterized in that the content of volatile compounds in product (P) is less than 1 wt % based on the mass of the polymer.

4. The process pursuant to claim 1 or 2, characterized in that the Fluid (F) contains from 3 to 50 wt % of a non-volatile polymer and from 60 to 97 wt % volatile compounds, whereby the aforementioned components add up to 90 to 100 of the total mass of fluid (F).

5. The process pursuant to claims 1 or 2, characterized in that the fluid (F) entering the heater (2) has a temperature of 10° C. to 100° C.

6. The process pursuant to claims 1 or 2, characterized in that the fluid (F) entering the heater (2) has a zero shear viscosity of 100 mPa*s to 60,000 mPa*s.

7. The process pursuant to claims 1 or 2, characterized in that the heated fluid G has a temperature of 100 to 200° C.

8. The process pursuant to claims 1 or 2, characterized in that the pressure in the degassing vessel (4) is in the range of 100 hPa to 4,000 hPa.

9. The process pursuant to claims 1 or 2, characterized in that the degassing vessel (4) is designed in the shape of a cyclone and has at least a torisperical shaped bottom to facilitate removal of concentrated fluid (H).

10. The process pursuant to claims 1 or 2, wherein fluid H is removed from the degassing vessel 4 by pump 4.2 wherein pump 4.2 selected from the group consisting of positive displacement type pumps, gear pumps, piston pumps, membrane pumps, screw type pumps, extruder type pumps like counter-rotating or co-rotating single or twin screw extruders or kneader type pumps or combinations thereof.

11. The process pursuant to claims 1 or 2, characterized in that the temperature of the concentrated fluid (H) is lower than that of heated fluid (G) and is in the range of 15 to 100° C.

12. The process pursuant to claims 1 or 2, characterized in that the temperature of the reheated concentrated fluid (L) is higher than that of the concentrated fluid (H) and is in the range of 50° C. to 200° C.

13. The process pursuant to claims 1 or 2, characterized in that the extruder unit comprises an extruder selected from the group consisting of single and multiscrew extruders.

14. The process pursuant to claims 1 or 2, characterized in that the extruder unit comprises means to operate separate zones of the extruder independently of each other at different temperatures so that the zones can either be heated, unheated or cooled.

15. The process pursuant to claims 1 or 2, characterized in that the extruder is made of a material selected from nitrided steel, duplex steel, stainless steel, nickel-based alloys, composite materials like sintered metals, hot isostatic pressed materials, hard wear resistant materials like Stellite, coated metals with coatings made from ceramics, titanium nitride, chromium nitride and diamond like carbon.

16. The process pursuant to claims 1 or 2, characterized in that the vent ports (15) comprise means to prevent the reheated concentrated fluid (L) or the Product (P), from coming out of the vent ports.

17. The process pursuant to claims 1 or 2, characterized in that the accumulation in the accumulating sections (18, 20) is accomplished by kneading or throttling elements, blister discs or die plates.

18. The process pursuant to claims 1 or 2, characterized in that the extruder unit comprises 1 to 30 conveying and accumulating sections.

19. The process pursuant to claims 1 or 2, characterized in that the outlet section (22) comprises means to allow the product to exit the extruder and product processing equipment, whereby the processing equipment is selected from the group consisting of combinations of die plates and cutters; die plates and underwater-pelletizing means; means for crumb formation, turbulators and fixed knifes placed at the end plate of the extrude.

20. The process pursuant to claims 1 or 2, characterized in that the outlet section (22) further comprises cooling means, whereby the cooling means are selected from the group consisting of pneumatic crumb conveyers with convective air cooling, vibrating crumb conveyers with convective air cooling, vibrating crumb conveyer with cooled contact surfaces, belt conveyers with convective air cooling, belt conveyer with cooled belts, water spraying on hot crumbs upon outlet of the extruder and underwater-pelletizing means.

21. The process pursuant to claims 1 or 2, characterized in that the extruder unit is operated at a feed rate of 5 to 25,000 kilograms per hour.

22. The process pursuant to claims 1 or 2, characterized in that a stripping agent is added in the extruder unit.

23. The process pursuant to claims 1 or 2, characterized in that additives are added to fluid (F) or in the extruder unit by means of a side feeder or, as far as they are liquid together with a stripping agent.

24. The process pursuant to claims 1 or 2, characterized in that step a) is repeated a least once.

25. The process pursuant to claims 1 or 2, characterized in that the repetition is accomplished by connecting the respective number of concentrating units in series.

26. The process pursuant to claims 1 or 2, characterized in that the pressure in the concentration unit, the reheating unit or the extruder unit is equipped with one or more pressure regulation devices.

27. The process pursuant to claims 1 or 2, characterized in that the extruder unit comprises at least one extruder degassing section in upstream direction.

28. The process pursuant to claims 1 or 2, characterized in that fluid (F) is produced by a process of removing hydrophilic compounds and optionally water from a crude fluid (A) containing at least one non-volatile polymer, at least one volatile organic compound, one or more hydrophilic compounds and optionally water which comprises at least the step of
   a) pretreating the crude fluid (A) in at least one pre-washing unit comprising at least a separating apparatus (26), whereby the fluid (A) is mixed with water to obtain an organic phase (28) comprising primarily non-volatile polymer and volatile organic compounds and an aqueous phase (27) comprising primarily water and hydrophilic compounds, and whereby the organic phase (28) is separated from the aqueous phase (27) in a separating apparatus (26) and further used as fluid F and whereby at least a part of the aqueous phase (27) is removed from the separating apparatus (fluid C).

29. The process pursuant to claim 28, characterized in that the separation is supported by means of a coalescer (39).

30. The process pursuant to claim 28, characterized in that step pre-a) is repeated at least once.

31. The process pursuant to claim 30, characterized in that the repetition is accomplished by connecting the respective number of separating apparatuses (26) in series.

32. The process pursuant to claim 28, characterized in that the separation is performed at temperatures of more than 40° C.

33. Device comprising a least
   one concentrating unit comprising a heater (2) in communication with a degassing vessel (4), whereby the bottom part of the degassing vessel (4) is in communication with a pump (4.2) the upper part of the degassing vessel (4) is in communication with at least one vapour line (4.1)
   one heating unit (6) in communication with the pump (4.2) of the concentrating unit and a feeding point (12) on an extruder unit
   one extruder unit comprising at least one feeding point (12), one extruder degassing section (16), one accumulating section (20) and one outlet section (22), whereby the extruder degassing section (16) further comprises at least one vent port (15) connected to a vapour line (15.1), wherein the device removes volatile compounds from fluid (F) according to claim 1.

34. Device pursuant to claim 33, characterized in that the pump (4.2) is selected from the group consisting of positive displacement type pumps, gear pumps, piston pumps, membrane pumps, screw type pumps, extruder type pumps like counter-rotating or co-rotating single or twin screw extruders or kneader type pumps or combinations thereof.

35. Device pursuant to claim 33 or 34, characterized in that the extruder unit comprises an extruder selected from the group consisting of single screw and multiscrew extruders.

36. Device pursuant to claims 33 or 34, characterized in that the extruder unit comprises a twin-screw extruder a ring extruder or a planetary roller extruder.

37. Device pursuant to claims 33 or 34, characterized in that the accumulating section (20) comprises kneading or throttling elements, blister discs or die plates.

38. Device pursuant to claims 33 or 34, characterized in that the outlet section (22) comprises product processing equipment selected from the group consisting of combinations of die plates and cutters; die plates and underwater-pelletizing means; means for crumb formation, turbulators and fixed knifes placed at the end plate of the extruder.

39. Device pursuant to claims 33 or 34, characterized in that the outlet section (22) comprises cooling means.

40. Device pursuant to claims 33 or 34, characterized in that it is operates with a feed rate of 5 to 25,000 kilograms per hour.

41. Device pursuant to claims 33 or 34, characterized in that the extruder unit comprises the addition of a stripping agent.

42. Device pursuant to claims 33 or 34, characterized in that the extruder unit comprises one or more side feeders.

43. Device pursuant to claims 33 or 34, characterized in that it comprises more than one concentration units, whereby the concentration units are connected in series.

44. Device pursuant to claims 33 or 34, characterized in that the concentration unit, the reheating unit or the extruder unit is equipped with one or more pressure regulation devices.

45. Device pursuant to claims 33 or 34, characterized in that the extruder unit comprises more than one extruder degassing sections, whereby the feeding point (12) is located at the first extruder degassing section, whereby the first extruder degassing section comprises at least one conveying section (16A), a rear vent port (13) connected to a vapor line (13.1) in upstream direction.

46. Device pursuant to claim 33 or 34, characterized in that it further comprises one or more pre-washing units, each comprising at least a separating apparatus (26) in communication with one or more of the concentration units.

47. Device pursuant to claim 46, characterized in that the separating apparatus (26) comprises at least one mixer (30).

48. Device pursuant to claim 46, characterized in that the separating apparatus (26) comprises at least one coalescer (39).

49. Device pursuant to claim 46, characterized in that the separating apparatus (26) comprises at least one separating wall (34).

50. Device pursuant to claim 46, characterized in that the separating apparatus (26) is designed to be operated under pressure.

51. Device pursuant to claim 33, characterized in that the degassing vessel (4) has at least torisperical shaped bottom.

52. A process of removing volatile compounds from a fluid (F) containing at least one non-volatile polymer and at least one volatile compound comprising the step of passing the fluid through the device according to claim 33.

53. Plant comprising at least one device according to claim 33.

* * * * *